(12) United States Patent
Kornecki

(10) Patent No.: US 7,562,517 B1
(45) Date of Patent: Jul. 21, 2009

(54) ROTARY CRIMPING APPARATUS FOR ELEVATED CROP BEDS

(75) Inventor: Ted S. Kornecki, Aubum, AL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 12/212,342

(22) Filed: Sep. 17, 2008

(51) Int. Cl.
*A01B 13/08* (2006.01)
(52) U.S. Cl. .............................. 56/504; 56/500; 172/554
(58) Field of Classification Search ................. 172/184, 172/187, 324, 328, 413, 500–505, 365, 370, 172/550, 552, 554; 460/111–113; 56/500–505
See application file for complete search history.

(56) References Cited

U.S. PATENT DOCUMENTS

| | | | | |
|---|---|---|---|---|
| 2,553,356 A | * | 5/1951 | Cady | 172/514 |
| 4,150,724 A | * | 4/1979 | Strobel | 172/328 |
| 4,193,457 A | * | 3/1980 | Sphar | 172/810 |
| 5,474,135 A | * | 12/1995 | Schlagel | 172/151 |
| 5,953,895 A | * | 9/1999 | Hobbs | 56/500 |
| 6,068,061 A | * | 5/2000 | Smith et al. | 172/139 |
| 6,539,697 B2 | * | 4/2003 | Burk | 56/504 |
| 6,968,907 B1 | | 11/2005 | Raper et al. | |

* cited by examiner

*Primary Examiner*—Robert E Pezzuto
(74) *Attorney, Agent, or Firm*—John D. Fado; Robert Jones

(57) ABSTRACT

The rotary crimper for elevated crop beds is designed to crimp and mulch a field of crops with an elevated bed-type structure. The rotary crimper has a tubular inner roller and a plurality of crimping members extending from the inner roller. The crimping members have at least two projecting portions and at least one non-projecting portion. Structural support braces are disposed between the crimping members and crimping plates extend from the support braces. Additional crimping structures also extend the length of the inner tubular roller between the crimping members. In operation, the non-projecting portions of the crimping members and the crimping structures crimp the crops on the elevated portion of the beds, and the crimping member projecting portions and the crimping plates crimp the crops in the furrows between the elevated beds.

20 Claims, 6 Drawing Sheets

ROTARY CRIMPING APPARATUS FOR ELEVATED CROP BEDS

FIELD OF THE INVENTION

The present invention relates to a mechanical means for "crimping" or mulching crops at the end of a growing cycle. Specifically, the invention relates to a rotary apparatus that is towed across a field of crops to crimp the crops in the field.

BACKGROUND OF THE INVENTION

Once a growing cycle has passed, crops from the past cycle are routinely destroyed prior to the planting of the next generation. One method of destroying the crops involves spraying the fields with a chemical herbicide that kills the crops and accelerates deterioration of the stalks. However, this method is relatively expensive and the runoff chemicals may be damaging to the environment. Further, a chemical means of destroying crops is not acceptable to organic growers.

Most current methods of mechanically destroying and mulching crops utilize relatively linear cutting or mulching surfaces that are designed based on the assumption that the surface of the affected field is essentially flat. Although the crops on the elevated portions of these fields may be destroyed, any crops in the field's furrows are not effectively reached by conventional mechanical methods.

The need exists for a mechanical means of crimping and mulching crops that addresses both the crops in the furrows as well as the crops in the elevated portions of the field. The current invention is designed to effectively destroy and mulch all crops including those grown on the upper surface of elevated beds and those grown in the furrows between the beds.

SUMMARY OF THE INVENTION

The current invention is a rotary crimper designed to effectively and efficiently crimp the crops in both the elevated and furrowed portions of a field. The rotary crimper has a tubular inner roller and a plurality of crimping members extending outwardly from the inner roller. The crimping members have an inner side that is adjacent to the inner roller and an outer side that is opposite the inner side. The outer side of the crimping members has a plurality of projecting portions and at least one non-projecting portion. Bracing members extend between the projecting portions of the crimping members. A crimping plate is positioned between each pair of the crimping members so that a crimping plate extends normal to each of the bracing members.

The crimping plates and the projecting portions of the crimping members are positioned to correspond with furrows in a field of crops. The non-projecting portions of the crimping members are positioned to correspond with relatively elevated portions of the field. In operation, towing the rotary crimper across the field crimps the stalks of the crops in the furrows as well as crimping the stalks in the elevated portions of the field so that all the crops are effectively destroyed and mulched.

DETAILED DESCRIPTION OF PREFERRED EMBODIMENTS

The present invention comprises a crimping apparatus designed to mulch crops in fields with elevated beds so that vegetation on the elevated beds is crimped and mulched as well as the vegetation in the associated furrows.

Figure 1:
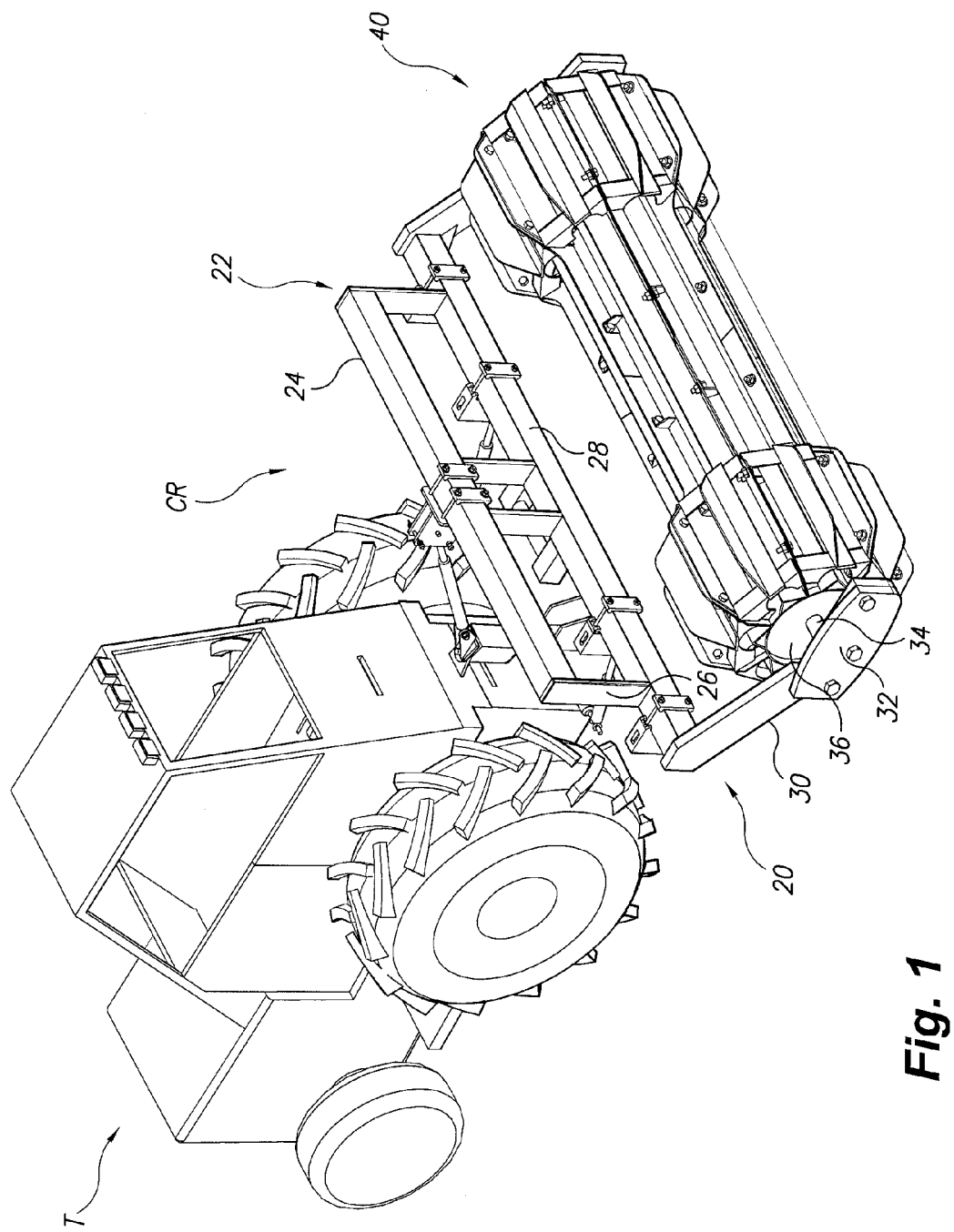
FIG. 1 is an environmental perspective view of the preferred embodiment of the crimping roller apparatus and an associated motive means (i.e. a tractor).

The current invention is generally shown in FIG. 1. In the preferred embodiment, the crimping roller apparatus for elevated beds CR comprises a roller system that is towed across a field by a tractor T. In alternative embodiments, the crimping roller apparatus CR may be self-propelled or may be propelled by any means known in the art and may include additional roller stages.

As generally shown in FIG. 1, the crimping roller apparatus CR comprises a main frame assembly 20, and a roller assembly 40. In the preferred embodiment, the frame assembly 20 is connected to the tractor T via a standard three-point free-link hitch. However, in alternative embodiments, the frame assembly 20 may be connected to the tractor T by any means known in the art.

The frame assembly 20 comprises a rectangular structural frame 22 with an upper horizontal member 24, vertically extending support braces 26, and a horizontally extending main structural member 28. Angular support arms 30 extend downwardly from the main structural support brace 28. End plates 32 are attached to the lower ends of the support arms 30. The inner side (not shown) of the end plates 32 includes an axle bearing structure. In alternative embodiments the end plates 32 may be omitted and the bearing structure may be disposed in the lower portion of the support arm 30. A roller assembly axle 34 extends through a hub 36 and is nested within the bearing structure so that the roller assembly axle 34 rotates within the bearing structure.

Figure 2:
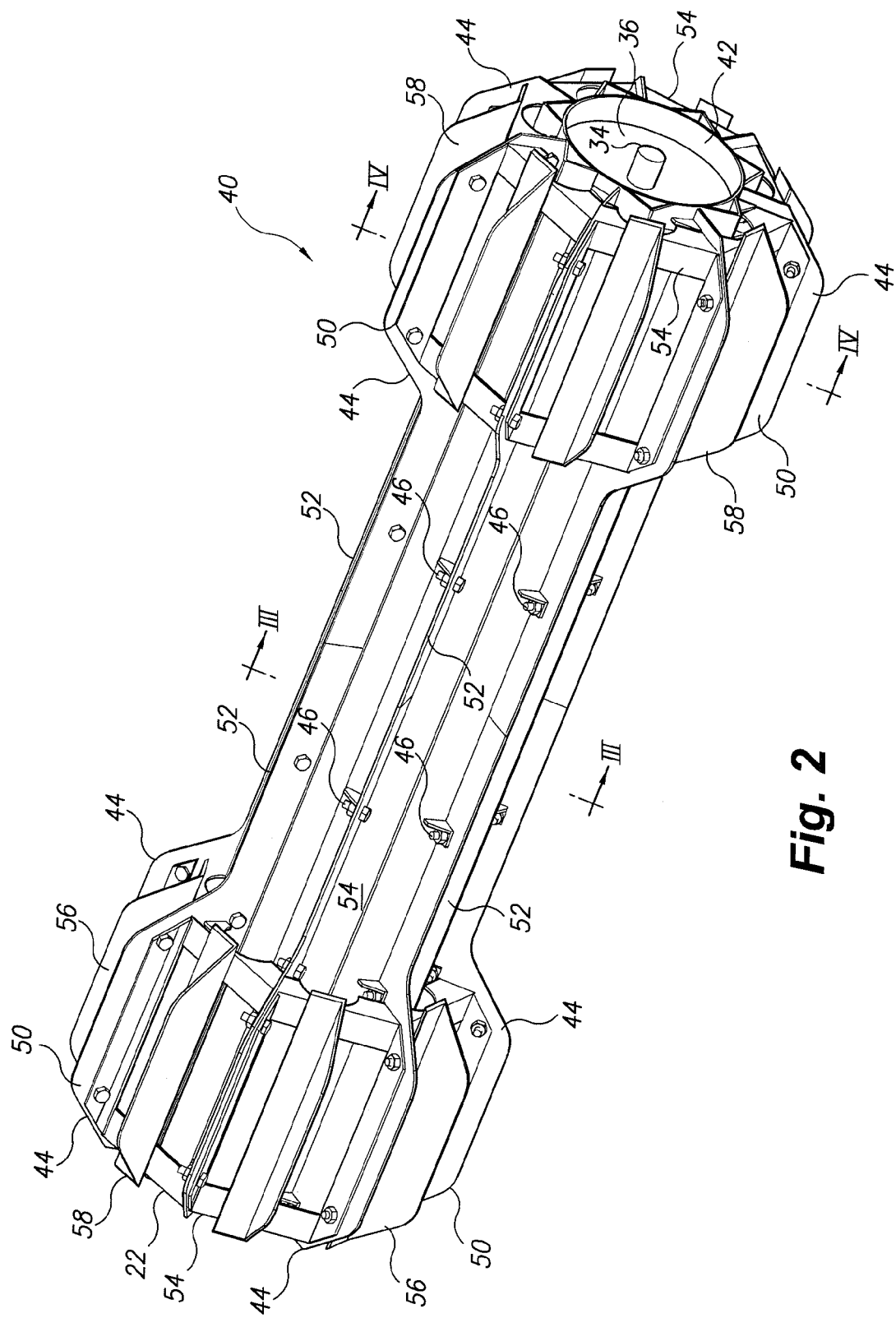
FIG. 2 is a perspective view of the roller assembly of the current invention.

FIGS. 2-5 show the structure of the roller assembly 40 in greater detail. FIG. 2 shows a perspective view of the roller assembly 40 and FIGS. 3-5 comprise cross sectional views that emphasize the mechanical structure of the crimping portion of the roller assembly 40. Multiple examples of many of the referenced components are shown in each figure. For the sake of simplicity, only exemplary components are assigned reference numbers. It should be assumed that all essentially identical components in a figure have the same reference number (as the essentially identical exemplary component).

As shown in FIGS. 2-5, the roller assembly 40 comprises a tubular inner roller 42 with a plurality of crimping members 44 extending outwardly from the inner roller 42. A plurality of crimping member retaining flanges 46 and associated bolts connect the crimping members 44 to the inner roller 42. Individual crimping members 44 can be easily changed by unbolting the crimping members 44 from the inner roller 42 via the associated retaining flanges 46. This capability allows a user to easily replace damaged crimping members 44, or to substitute alternatively configured crimping members 44 with a different shape or mulching characteristics to accommodate various specific applications.

Figure 3:
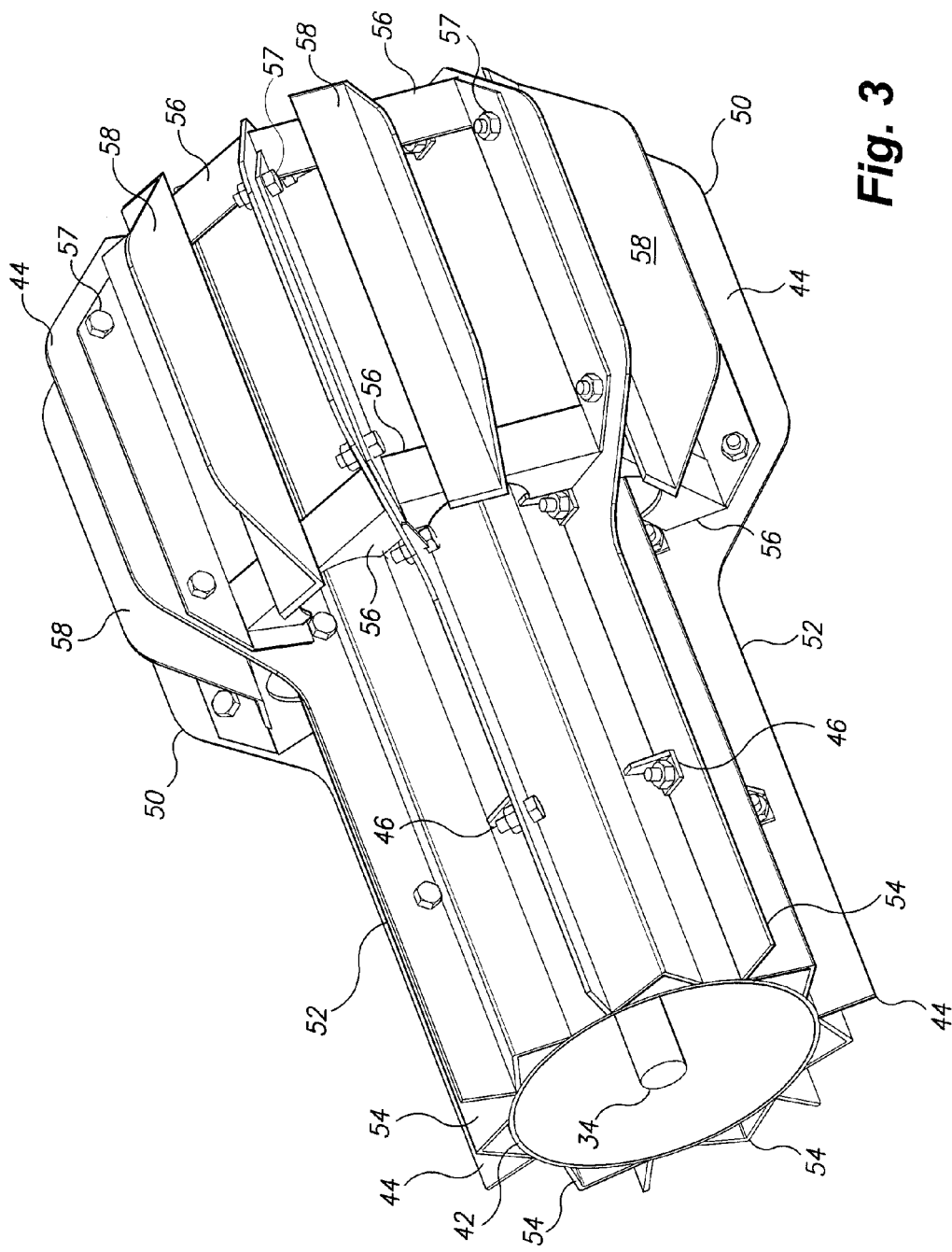
FIG. 3 is a cross sectional view of the crimping wheel along the section line III shown in FIG. 2.

As best shown in FIGS. 2 and 3, the crimping members 44 extend the length of the roller assembly 40. The crimping members 44 have a generally corrugated shape which includes at least two outwardly projecting portions 50 disposed on the ends of the roller assembly 40, and at least one non-projecting portion 52 disposed between the projecting portions 50. In the preferred embodiment, the crimping member projecting portions 50 have an inverted frustoconical shape. However, in alternative embodiments, the crimping members 44 and projecting portions 50 may have sharpened edges and/or a saw tooth-type shape, or any other shape known in the art consistent with the mulching function.

A plurality of essentially triangular crimping structures 54 also project outwardly from the inner roller 42 and extend the length of the length of the roller assembly 40. In alternative embodiments, the crimping structures 54 may have any shape known in the art and may not extend linearly. For example, the crimping structures 54 may have a curved shape and may be intermittent.

Figure 4:
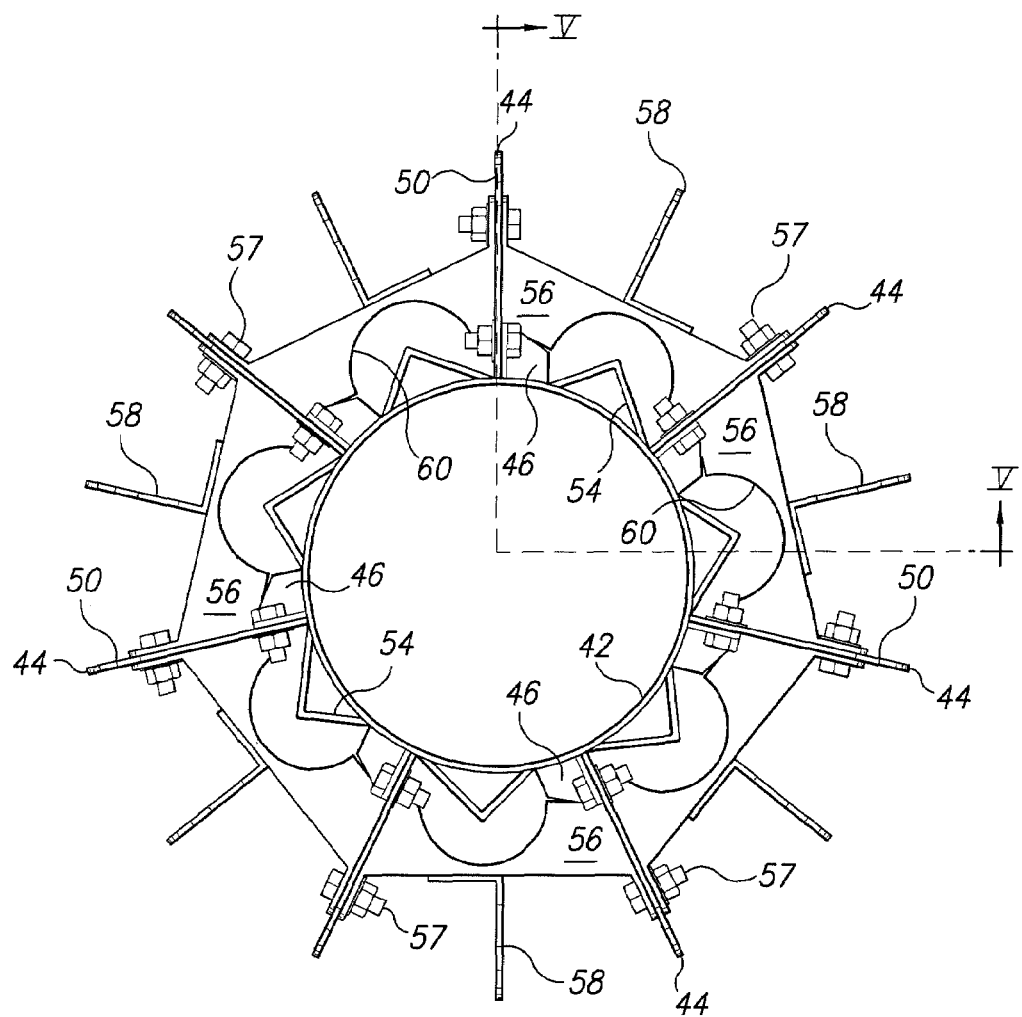
FIG. 4 is a cross sectional view of the crimping wheel along the section line IV shown in FIG. 2.
Figure 5:
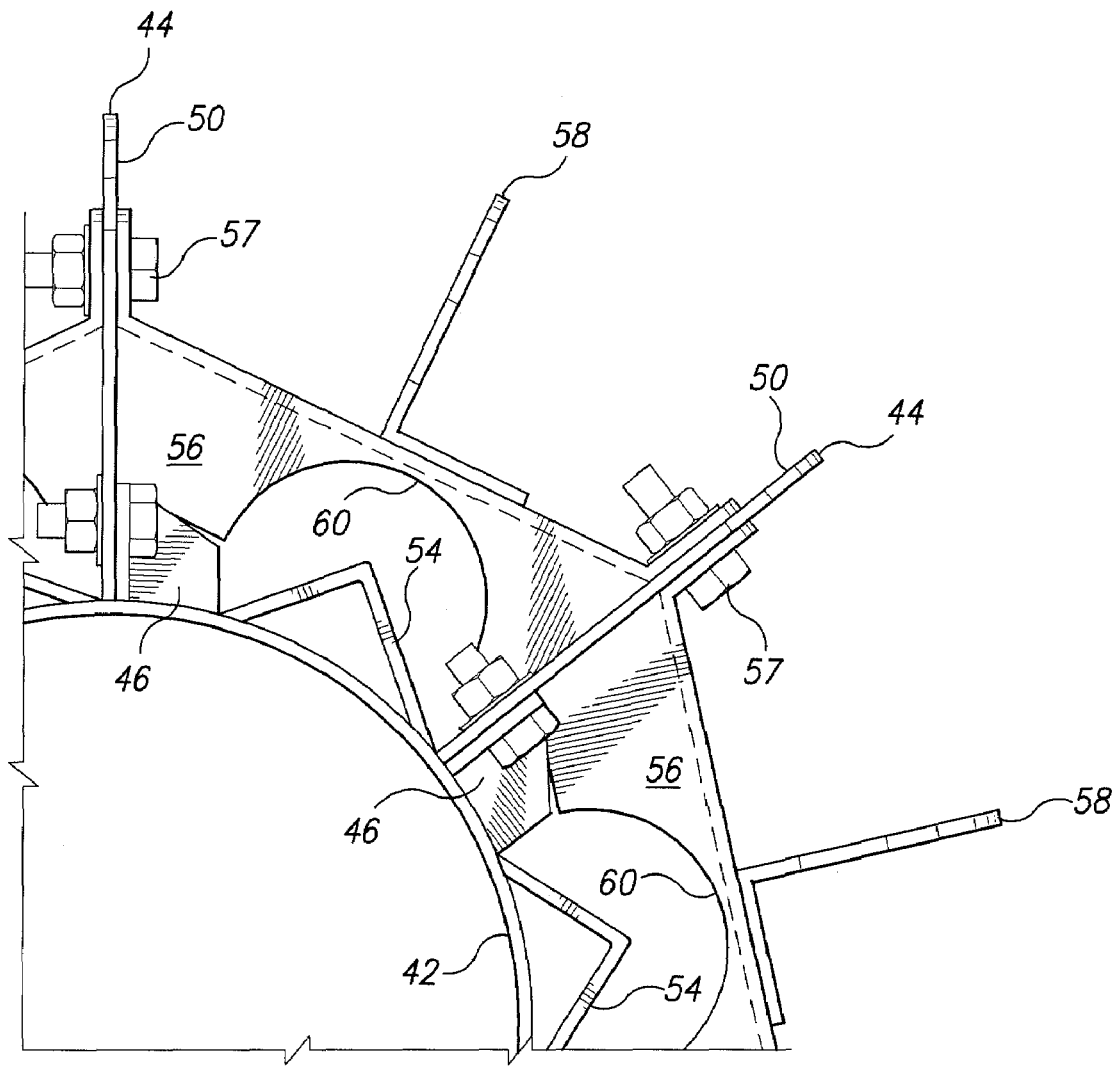
FIG. 5 is an enlarged view of a section of FIG. 4 designated by the dashed line V

FIGS. 4 and 5 show the structure of the end sections of the roller assembly 40 in greater detail. As best shown in FIGS. 4 and 5, bracing members 56 extend between the projecting portions 50 of the crimping members 44. In the preferred embodiment, the end portions of the bracing members 56 bolt to the associated crimping members 44 via a connecting bolt 57. In alternative embodiments, the bracing members 56 may be connected to the associated crimping members 44 by any means known in the art.

A crimping plate 58 is disposed atop each bracing member 56. In the preferred embodiment, the crimping plate 58 has an "L" shape and the projecting portion of the crimping plate has a frustoconical shape. In alternative embodiments, the projecting portion of the crimping plates 58 may have sharpened edges and/or a saw tooth-type shape, or any other shape known in the art consistent with the mulching function.

As best shown in FIGS. 4 and 5, end portions of each crimping plate 58 are positioned atop corresponding bracing members 56. A crimping plate 58 is positioned between and extends parallel to each pair of crimping members 44. The crimping plates 58 extend normal to each of the bracing members 54. The projecting portions of the crimping plates 58 are also disposed in the same plane with the apex of the longitudinally extending triangular crimping structures 54. An arc 60 is cut in each of the bracing members 56 so that the bracing members 56 do not contact the triangular crimping structures 54. In alternative embodiments, the bracing members 56 may be connected directly with the triangular crimping structures 54.

In operation, after the growing cycle has ended, the rotary crimper CR of the current invention is towed across a field with elevated planting beds. The non-projecting portions 52 of the crimping members 44 and the triangular crimping structures 54 crimp and mulch the crops on the elevated beds. Simultaneously, the crimping member projecting portions 50 and crimping plates 58 crimp and mulch any vegetation in the furrows between the elevated beds. Consequently, when the current invention is towed across a field with elevated crop beds, all the crops from the previous growing cycle are effectively crimped and mulched.

Figure 6:
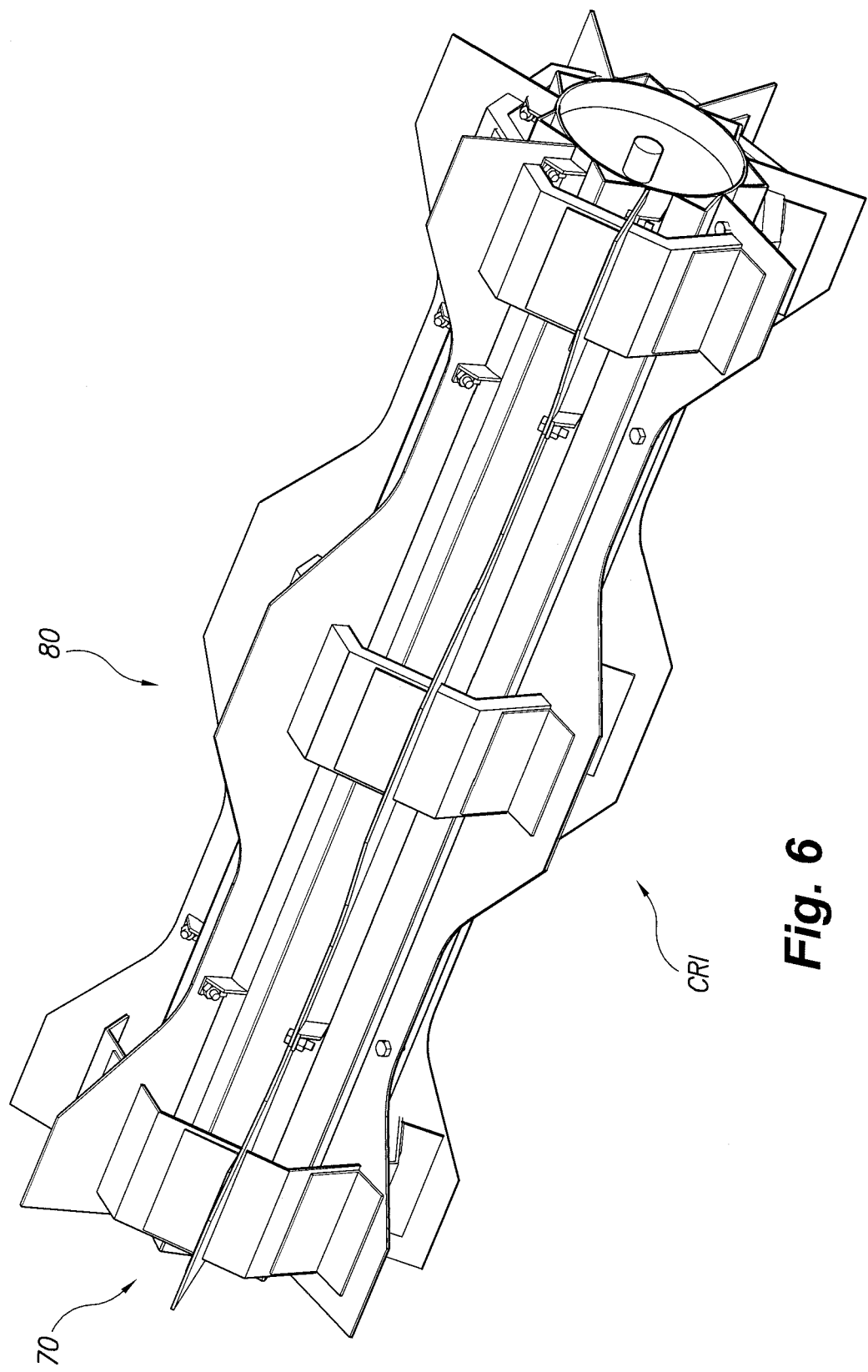
FIG. 6 is an elevational view of an alternative embodiment.

An alternative embodiment of the current invention is shown in FIG. 6. In the alternative embodiment, the roller portion 70 of the crimping roller CR1 has been modified so that the invention can accommodate a field in which there are two separate elevated beds separated by a furrow. Essentially, an intermediate section 80 that includes alternating crimping plates and additional projecting sections of the crimping members has been added to the embodiment shown in FIG. 2. The specific configuration of the added section is similar to the structure shown in the greater detail in FIGS. 4 and 5. Other aspects of the invention remain generally unchanged from the preferred embodiment shown in FIG. 2.

For the foregoing reasons, it is clear that the preferred embodiment and associated alternative embodiments of the current invention provide an innovative crop crimping and mulching system for elevated beds. The invention may be modified in multiple ways and applied in various technological applications. The current invention may be customized as required by a specific operation or application, and the individual components may be modified and defined, as required, to achieve the desired result. Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A rotary crimper comprising:
   a tubular inner roller;
   a plurality of crimping members, each crimping member extending normal to the inner roller, the crimping members having:
   (a) an inner side adjacent the inner roller; and
   (b) an outer side opposite the inner side, the outer side having at least two projecting portions and at least one non-projecting portion;
   a plurality of bracing members, each bracing member extending between the projecting portions of two of the crimping members; and
   a plurality of crimping plates, each crimping plate extending normal to the bracing members, each crimping plate positioned intermediate two of the crimping members;
   whereby the crimping plates and the projecting portions of the crimping members are positioned to correspond with furrows in a field of crops, and the non-projecting portions of the crimping members are positioned to correspond with relatively elevated portions of the field of crops so that towing the rotary crimper across the field crimps the stalks of the crops in the furrows as well as crimping the stalks of the crops in the elevated portions of the field.

2. The rotary crimper as described in claim 1 wherein the crimping plates have a projecting portion and a non projecting portion, the non projecting portion being attached to at least one of the bracing members.

3. The rotary crimper as described in claim 2 wherein the crimping plate projecting portion has an inverted frustoconical shape.

4. The rotary crimper as described in claim 2 wherein the crimping plate has an L shape.

5. The rotary crimper as described in claim 2 further comprising a crimping structure projecting from the inner roller and disposed between two of the crimping members.

6. The rotary crimper as described in claim 5 wherein an upper portion of the crimping structure has a triangular shape.

7. The rotary crimper as describe in claim 6 wherein an apex of the crimping structure lies in the same plane with the projecting portion of the crimping plate.

8. The rotary crimper as described in claim 5 wherein the crimping structure is linear and extends parallel to an axis of the inner roller.

9. The rotary crimper as described in claim 5 wherein the crimping structure extends from one end of the inner roller to an opposing end of the inner roller.

10. The rotary crimper as described claim 1 wherein the projecting portions of the crimping members have an inverted frustoconic shape.

11. The rotary crimper as described in claim 1 wherein the rotary crimper has at least three projecting portions and at least two non-projecting portions.

12. The rotary crimper as described in claim 1 further comprising hubs disposed at each longitudinal end of the rotary crimper.

13. The rotary crimper as described in claim 12 further comprising an axle extending longitudinally through the center of the rotary crimper and further extending through the hubs disposed at each end of the rotary crimper.

14. The rotary crimper of claim 13 further comprising a main frame assembly, the main frame assembly comprising:
  an upper horizontal member;
  a horizontally extending main structural member disposed parallel to the upper horizontal member;
  a plurality of vertically extending support braces connecting the upper horizontal member with the main structural member;
  at least a pair of angular arms, a proximal end of each of the arms connecting with an end of the main structural member, a distal end of each of the arms extending downwardly;
  a pair of end plates connected with the distal end of the arms; and
  an end plate bearing structure disposed on each of the end plates;
  wherein opposing ends of the axle are nested in the bearing structure disposed on each of the end plates, thereby enabling the rotary crimper to rotate as a motive means propels the rotary crimper across a field.

15. The rotary crimper of claim 14 wherein the rotary crimper is attached to a tractor by a three-point free-link hitch.

16. The rotary crimper of claim 15 wherein an upper portion of a three-point free-link hitch is attached to the upper horizontal member, and two lower portions of the three-point free-link hitch are attached to the main structural member.

17. A rotary crimper comprising:
  a tubular inner roller;
  a plurality of crimping members, each crimping member extending normal to the inner roller, the crimping members having:
    (a) an inner side attached to the inner roller; and
    (b) an outer side opposite the inner side, the outer side having at least two projecting portions and at least one non-projecting portion disposed between the two projecting portions;
  a plurality of bracing members, each bracing member extending between the projecting portions of two of the crimping members;
  a plurality of crimping plates, the crimping plates having a projecting portion and a non projecting portion, the non projecting portion of each of the crimping plates being attached to and extending normal to two of the bracing members, each crimping plate extending between and parallel to two of the crimping members; and
  a triangular crimping structure extending from one end of the inner roller to an opposite end of the inner roller, an apex of the triangular crimping structure being disposed in the same plane as the projecting portion of the crimping plate;
  whereby the crimping plates and the projecting portions of the crimping members are positioned to correspond with furrows in a field of crops, and the non-projecting portions of the crimping members and the triangular crimping structures are positioned to correspond with relatively elevated portions of the field of crops so that towing the rotary crimper across the field crimps the stalks of the crops in the furrows as well as crimping the stalks of the crops in the elevated portions of the field.

18. A method of making a rotary crimper for elevated beds, the method comprising the steps of:
  providing a tubular inner roller;
  attaching crimping members to the inner roller so that the crimping members project outwardly from the inner roller;
  linking the crimping members together with bracing members so that the bracing members form a concentric frame around end portions of the inner roller;
  connecting crimping plates to the bracing members so that the crimping plates are disposed between and extend parallel to the crimping members; and
  attaching outwardly projecting triangular crimping structures to the inner roller so that the crimping structures are disposed between the crimping members.

19. The method of claim 18 further comprising the step of:
  forming an outer side of the crimping member so that the outer side has a corrugated profile comprising at least two projecting portions and at least one non projecting portion.

20. The method of claim 19 further comprising the step of:
  adding a structural frame to the inner roller thereby enabling the rotary crimper to be towed across a field by a tractor.

* * * * *